(12) United States Patent
Kaznady (10) Patent No.: US 10,366,451 B2
(45) Date of Patent: Jul. 30, 2019

(54) SYSTEM AND METHOD FOR PREDICTION USING SYNTHETIC FEATURES AND GRADIENT BOOSTED DECISION TREE

(71) Applicant: Max S Kaznady, Toronto (CA)

(72) Inventor: Max S Kaznady, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 555 days.

(21) Appl. No.: 15/007,593

(22) Filed: Jan. 27, 2016

(65) Prior Publication Data

US 2017/0213280 A1 Jul. 27, 2017

(51) Int. Cl.
*G06Q 40/02* (2012.01)
*G06N 20/00* (2019.01)
*G06N 5/00* (2006.01)

(52) U.S. Cl.
CPC ........... *G06Q 40/025* (2013.01); *G06N 5/003* (2013.01); *G06N 20/00* (2019.01)

(58) Field of Classification Search
USPC ............................................ 705/38, 35, 1.1
See application file for complete search history.

(56) References Cited

U.S. PATENT DOCUMENTS

| | | | |
|---|---|---|---|
| 7,028,007 B1 | 4/2006 | Abrahams et al. | |
| 8,417,715 B1* | 4/2013 | Bruckhaus | G06F 17/30994 |
| | | | 705/26.1 |
| 8,429,103 B1 | 4/2013 | Aradhye et al. | |
| 8,751,421 B2 | 6/2014 | Anderson et al. | |
| 2002/0123960 A1* | 9/2002 | Ericksen | G06Q 40/00 |
| | | | 705/38 |
| 2005/0033719 A1* | 2/2005 | Tirpak | G06F 17/30557 |
| 2011/0106690 A1 | 5/2011 | Fisher | |
| 2012/0084196 A1 | 4/2012 | Capozza | |
| 2013/0142418 A1* | 6/2013 | van Zwol | G06K 9/00751 |
| | | | 382/159 |
| 2014/0081832 A1* | 3/2014 | Merrill | G06Q 40/02 |
| | | | 705/38 |
| 2014/0177947 A1 | 6/2014 | Krizhevsky et al. | |
| 2014/0180986 A1 | 6/2014 | Hinton et al. | |
| 2014/0180989 A1 | 6/2014 | Krizhevsky et al. | |
| 2014/0358828 A1 | 12/2014 | Phillipps et al. | |
| 2015/0026034 A1 | 1/2015 | Stibel | |
| 2015/0032598 A1* | 1/2015 | Fleming | G06Q 40/025 |
| | | | 705/38 |

(Continued)

FOREIGN PATENT DOCUMENTS

CN 104717124 A 6/2015
WO 2014/110167 A2 7/2014

OTHER PUBLICATIONS

Data Mining on Loan Default Prediction Boston College Haotian Chen, Ziyuan Chen, Tianyu Xiang, Yang Zhou May 1, 2015 (Year: 2015).*

(Continued)

*Primary Examiner* — William E Rankins (57) ABSTRACT

A machine learning system and method are disclosed in which a plurality of synthetic features are created from input data, and a gradient boosted decision tree algorithm is then executed by the computer to process both the synthetic features and at least some of the input data to produce an output that is a probability.

15 Claims, 6 Drawing Sheets

(56) References Cited

U.S. PATENT DOCUMENTS

2015/0100530 A1 4/2015 Mnih et al.
2016/0307101 A1 10/2016 Zhang et al.

OTHER PUBLICATIONS

Ming Ting, Kai et al., "Stacked Generalization: when does it work?", published in 1997, pp. 1-6.
Jerome Friedman et al., "Regularization Paths for Generalized Linear Models via Coordinate Descent", Journal of Statistical Software, Jan. 2010, pp. 1-22, vol. 33, Issue 1, published by the American Statistical Association.
Koren, Yehuda, "The BellKor Solution to the Netflix Grand Prize", Aug. 2009, pp. 1-10.
Bell, Robert M. et al., "The BellKor 2008 Solution to the Netflix Prize", published in 2009, pp. 1-21.
Töscher, Andreas, et al., "The BigChaos Solution to the Netflix Prize 2008", Nov. 25, 2008, pp. 1-17.
Breiman, Leo, "Random Forests", Machine Learning, Apr. 11, 2001, pp. 1-28, 45, 5-32, Kluwer Academic Publishers.
Chen, Edwin "Winning the Netflix Prize: A Summary" Oct. 24, 2011, http://blog.echen.me/2011/10/24/winning-the-netflix-prize-a-summary/, pp. 1-8.

* cited by examiner

SYSTEM AND METHOD FOR PREDICTION USING SYNTHETIC FEATURES AND GRADIENT BOOSTED DECISION TREE

FIELD

The following relates to machine learning, and in particular to machine learning for prediction using synthetic features and a gradient boosted decision tree.

BACKGROUND

Machine learning is a type of artificial intelligence in which a computer is configured to learn without necessarily being explicitly programmed. For example, a computer may be configured to search through data and look for patterns, and then automatically adjust the actions of the computer program based on the patterns found.

In some applications, machine learning may be used to make a prediction. This may be done by first training the computer using past data for which the outcome is known, which is called supervised learning. The computer may extract rules or relationships during the training period. Then, when new inputs arrive, the computer uses the extracted rules or relationships to make a prediction.

As an example, machine learning may be used to predict whether rain will occur on a given day. First, in the training phase, the computer may be provided with several data inputs. Each data input corresponds to a respective day in the past and indicates the average temperature for that day, the humidity at 8 AM of that day, the day of the year, and whether or not it actually rained that day. The machine learning method then looks for patterns in the input data and extracts rules or relationships between particular input data parameters, such as what the temperature was and what day of the year it was, and the result: rain or no rain. Once the training is completed, when a new set of input data is sent to the computer for a particular day, then the computer will return a prediction of whether rain will occur that day.

SUMMARY

There are certain events for which there is potentially a lot of data and potentially many influencing factors that may affect the outcome of the event, such that meaningful prediction is not feasible by a human. Machine learning by a computer instead needs to be used. However, different types of events exist in different domains and are influenced by different factors. For example, predicting whether it will rain on a given day has influencing factors that will typically be much different from predicting whether a person will default on a loan. A specific machine learning system and method catered to a specific type of event and related influencing factors may be created.

Machine learning methods and systems are disclosed below for specifically predicting the probability of a loan applicant defaulting on a loan.

In one embodiment, a method is disclosed that may include a computer obtaining a set of data relating to a loan application. The computer may then determine a plurality of synthetic features by at least: executing a plurality of machine learning algorithms, each of the machine learning algorithms, when executed, receiving as an input at least some of the data and producing as an output a respective synthetic feature representing an initial probability of whether a loan default will occur. The computer may then execute a gradient boosted decision tree algorithm to process both the synthetic features and at least some of the data to produce an output representing a final probability of whether the loan default will occur.

In another embodiment, a system is disclosed that may include a memory to store a set of data relating to a loan application, and a predictor to receive the data and to produce an output representing a final probability of whether a loan default will occur. The predictor may include a plurality of learners, each learner implementing a respective machine learning algorithm. The predictor may be configured to: (1) determine a plurality of synthetic features by sending to each of the learners at least some of the data, and each of the learners outputting a respective synthetic feature representing an initial probability of whether the loan default will occur; and (2) execute a gradient boosted decision tree algorithm to process both the synthetic features and at least some of the data to produce the output representing the final probability of whether the loan default will occur.

In another embodiment, a system is disclosed that may include at least one processor, and memory having stored thereon processor-executable instructions. The processor-executable instructions, when executed, cause the at least one processor to: (1) determine a plurality of synthetic features by at least: executing a plurality of machine learning algorithms, each of the machine learning algorithms, when executed, receiving as an input at least some of the data and producing as an output a respective synthetic feature representing an initial probability of whether a loan default will occur; and (2) execute a gradient boosted decision tree algorithm to process both the synthetic features and at least some of the data to produce an output representing a final probability of whether the loan default will occur.

Other aspects and features will become apparent to those of ordinary skill in the art upon review of the following description.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Figure 1:
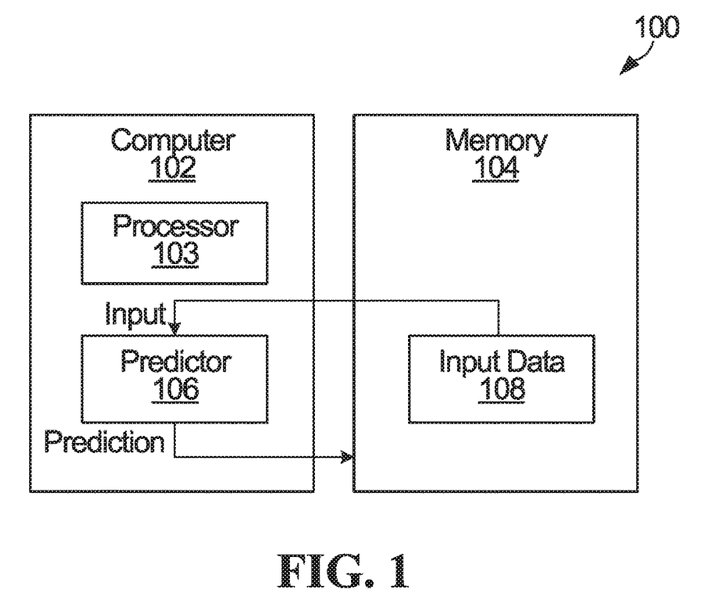
FIG. 1 is a block diagram of a system for predicting an event in accordance with one embodiment.

FIG. 1 is a block diagram of a system 100 for predicting an event in accordance with one embodiment. The system 100 includes a computer 102 and a memory 104. The computer 102 is illustrated as a single physical entity, but alternatively the computer 102 may be physically dispersed and connected through a network, which may be the case in distributed computing or cluster computing. The word "computer" is meant to encompass all such types of computing devices, whether big or small, distributed, clustered, or self-contained. The computer includes one or more processors, illustrated as a single processor 103.

The computer 102 implements a predictor 106, which may be functionality implemented in one or more of hardware, firmware, or software in combination with one or more processors to run the software. For example, the predictor 106 may be implemented by the processor 103 executing a series of instructions defining the actions of the predictor 106. Alternatively, the predictor 106 may comprise dedicated integrated circuitry, such as an application specific integrated circuit (ASIC), a graphics processing unit (GPU), or a programmed field programmable gate array (FPGA) for performing one or more of the functions of the predictor 106.

The memory 104 is accessed by the computer 102. The memory 104 is illustrated as physically separated from the computer 102, although the memory 104 could instead be implemented as part of the computer 102. Stored in the memory 104 is input data 108. The input data 108 is used by the predictor 106 to predict whether an event will occur. The prediction may be in the form of a probability of the event occurring. Each item of information in the input data 108 is also called a feature. For example, in embodiments discussed below the predictor 106 is used to determine a probability that a loan default will occur. In such embodiments, the features include information obtained from the loan application, such as the loan amount requested, the salary of the loan applicant, the loan duration, etc. The predictor 106 may additionally create synthetic features. Synthetic features are features that are not present in the input data 108, but are created by the predictor 106 and used by the predictor 106 in addition to or instead of the features in the input data 108. A synthetic feature may represent information that would not normally be determined or collected and included as part of the input data 108. For example, the input data 108 may include two features: loan amount requested by the loan applicant, and the salary of the loan applicant. The predictor 106 may use these two features to derive a synthetic feature: the probability that the loan applicant is between the ages of 30 and 35. A synthetic feature may be created using one or more machine learning algorithms, as discussed below.

In operation, the predictor 106 makes a prediction of an event occurring using the input data 108. The prediction may be returned to the memory 104, as shown, or instead directly sent to a user or another processing module.

Figure 2:
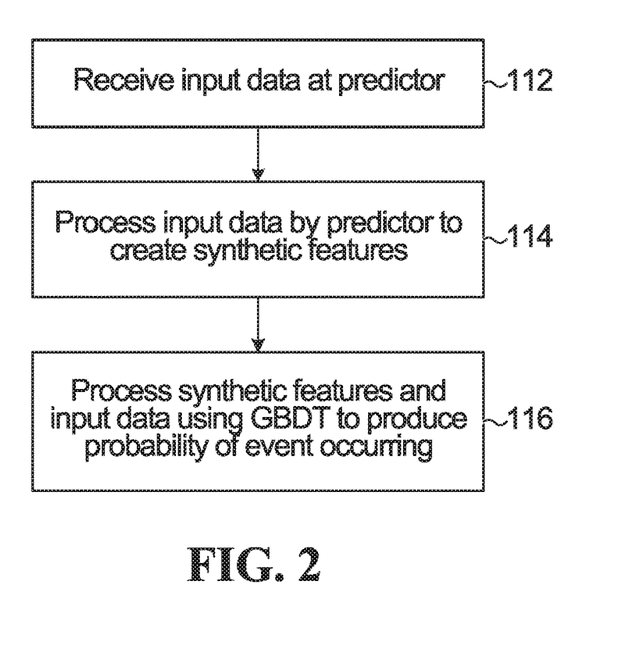
FIG. 2 is a flowchart of a method for predicting an event in accordance with one embodiment.

FIG. 2 is a flowchart of a method performed by the predictor 106 for predicting an event in accordance with one embodiment. In step 112, the input data 108 is received at predictor 106. In step 114, the predictor 106 processes at least some of the input data 108 to create synthetic features. In step 116, the predictor 106 executes a gradient boosted decision tree (GBDT) algorithm to process the synthetic features and at least some of the input data 108 to produce an output, which is the probability of the event occurring.

The step of creating the synthetic features and including them with the input data 108 may be referred to as generalized stacking (GS). For example, the input data 108 may be stored in the form of a table, and columns may be added to the table through the GS process, with each column corresponding to a respective synthetic feature, and each row of that column containing a value for that synthetic feature. The value for the synthetic feature may be a synthetic measurement of an event occurring, such as the probability of default on a loan.

FIGS. 1 and 2 illustrate a system and method that is not limited to predicting a particular event. The embodiments discussed in relation to the remaining figures adapt the system in FIG. 1 and the method of FIG. 2 to the specific application of predicting a probability of loan default.

A lending institution may issue different types of money loans, such as a traditional money loan or a micro-loan. A micro-loan is generally a loan for a smaller amount of money and typically for a shorter loan duration. A borrower may sometimes default on a loan. The systems and methods described below predict a probability of loan default (PD). The PD is a measure of the probability that the loan applicant will default on a loan, and the PD is based at least in part on the information derived from the loan application. Default may mean that the loan is not fully paid back by the borrower, or the loan is paid back but in a delinquent manner, such as later than the agreed-upon payment schedule. In the examples below, a loan default is considered to happen when the loan is not paid back according to the agreed-upon terms. The event is a binary one: either loan default occurs, or loan default does not occur.

When a borrower does not default on a loan, it may be said that the loan survives. A survival probability (SP) is defined as: $SP=1-PD$. For example, if a person applies for a loan and it is determined that there is a 23.1% chance that the person will default on the loan, then $PD=-0.231$ and $SP=0.769$.

A loan default may happen for different reasons that may change over time. Therefore, when designing a system that predicts PD, it may not be possible to determine ahead of time which machine learning methods are best suited for loan default prediction. Also, most loans typically do not default, which means that there are fewer instances in which the event of loan default actually occurs, which may make it harder to predict PD. In addition, inputs used by the prediction method may sometimes be unavailable, such as when a person refuses to provide certain information in a loan application. For example, the person's annual income may be used to help predict PD, but there may be cases in which the loan applicant refuses to provide their annual income. Also, loan defaults may be influenced by a combination of different factors, such as the loan applicant's demographics, the loan applicant's banking profile, the loan applicant's recent transaction history, and maybe even their social media profile. Other macro and micro economic factors may also contribute to influencing whether a loan default will occur, such as the neighbourhood in which the loan applicant lives or the current Gross Domestic Product (GDP) of the country. As a result, the example systems and methods described below utilize different predicting methods applied to a combination of different information via different machine learning algorithms, and leverage these predictions to boost predictive power using GS.

Figure 3:
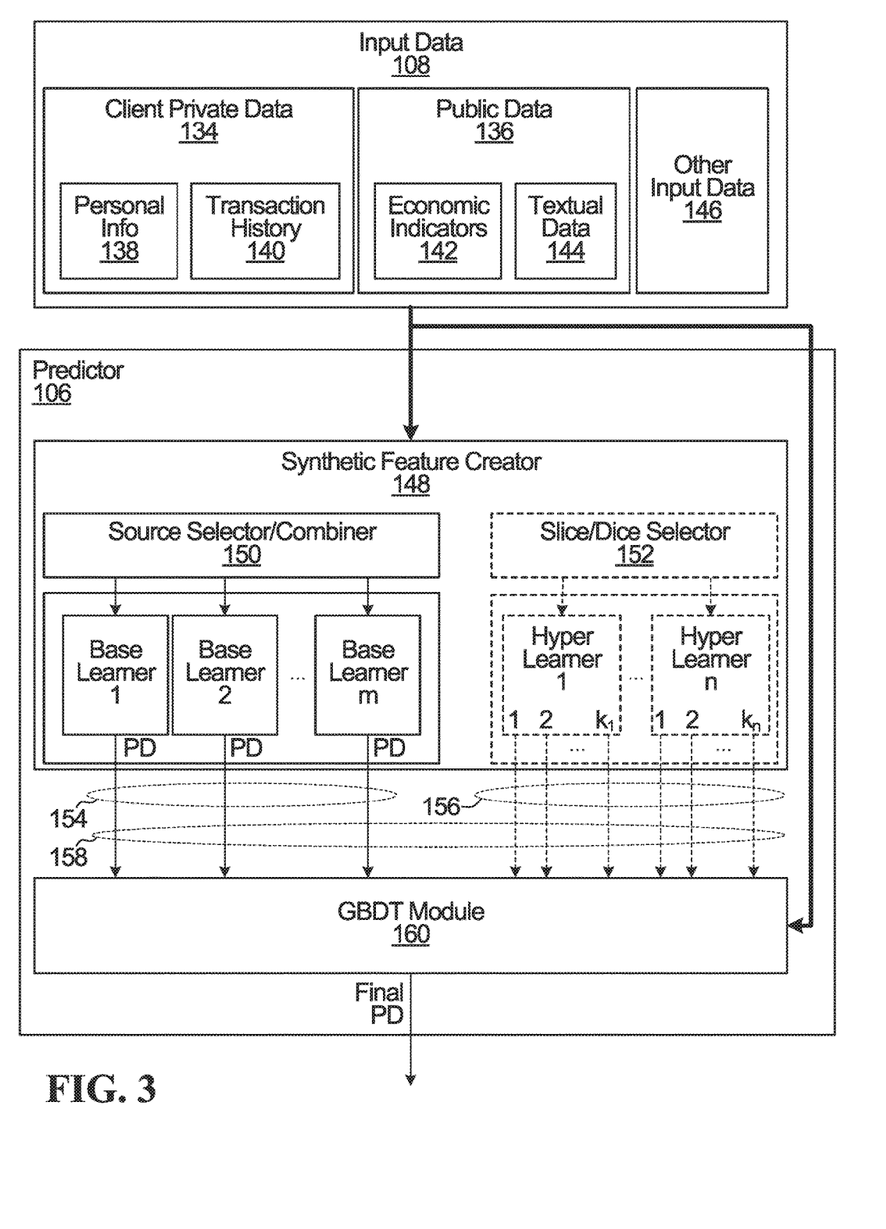
FIG. 3 is a block diagram of a predictor in accordance with one embodiment.

FIG. 3 is a block diagram of the predictor 106 in accordance with one embodiment in which the predictor 106 is specifically configured to compute the PD. FIG. 3 also shows an instance of the input data 108, which in this embodiment is the information available in relation to a loan application made by a loan applicant.

The input data 108 may include the loan applicant's private data 134, as well as public data 136. The loan applicant's private data 134 may include personal information 138 relating to the loan applicant, which may have been provided by the loan applicant or already available to the lending institution from a past transaction with the loan applicant. Examples of personal information 138 which may be included are: loan amount requested, income, employer, credit rating, level of education, written explanation of why a loan is requested, a social media profile, etc. Other personal information about the loan applicant, such as the loan applicant's age and sex, may also be used, although the use of such information may be subject to local laws or regulations. The loan applicant's private data 134 may also include transaction history 140, which is a history of financial transactions completed by the loan applicant. In some embodiments, the transaction history 140 may include shopping history. The public data 136, if available, may include economic indicators 142 and textual data 144. Examples of economic indicators 142 which may be used include GDP of the country, interest rates, and loan default rates for a given demographic. Examples of textual data 144 that may be used include trending news stories, such as a discussion of a real estate bubble. Other input data 146 may also be available, e.g., data that is confidential to the lending institution but that is not specifically related to the loan applicant.

The predictor 106 includes a synthetic feature creator 148 and a GBDT module 160. The synthetic feature creator 148 processes the input data 108 to create a plurality of synthetic features 158. The GBDT module 160 receives the synthetic features 158 and at least some of the input data 108, and outputs a final PD.

The synthetic feature creator 148 includes a plurality of base learners 1 to m and an associated source selector and combiner 150.

Each base learner 1 to m is a learner that implements a machine learning algorithm that, when executed, accepts one or more inputs and outputs an initial PD that is computed based on the inputs. The outputs of the base learners 1 to m are indicated at 154.

The source selector and combiner 150 is the interface between the input data 108 and the base learners 1 to m. The source selector and combiner 150 maps different features from the input data 108 to different base learners. For example, base learner 1 may be a neural network (NN) that is designed to predict PD based on the loan applicant's transaction history 140, in which case the source selector and combiner 150 maps the loan applicant's transaction history 140 from the input data 108 to the input of base learner 1. Base learner 2 may be a Random Forest algorithm that predicts PD on the basis of a large set of a loan applicant's categorical attributes, e.g. whether the loan applicant has a mortgage, what kind of car the loan applicant has, the loan applicant's occupation, etc. The source selector and combiner 150 would therefore map the information used by base learner 2 from the input data 108 to the input of base learner 2.

As part of mapping the input data 108 to base learners 1 to m, the source selector and combiner 150 may convert the input data 108 into a form that is usable by the machine learning algorithms of the base learners. For example, one loan applicant may write in a loan application that "I want this loan to perform a renovation on my house", and another loan applicant may write "I want this loan to help pay for my wedding". Sentences such as these may be part of the input data 108, but the information they convey may not be in a form that can be processed by a base learner. The source selector and combiner 150 may therefore perform a search of the text looking for key words and map the key words to values that can be subsequently used by a base learner. For example, the source selector and combiner 150 may perform binary encoding in which labels are mapped to binary values as follows: "renovation"=001 and "wedding"=010, etc. The binary values obtained from the text are then sent to the input of the appropriate base learners. The operation of obtaining inputs for a machine learning algorithm based on text or other information in the input data 108 that is not in a form usable by the machine learning algorithm may be referred to as feature extraction. Encoding performed by the source selector and combiner 150 as part of the feature extraction may generate additional features. The encoding performed by the source selector and combiner 150 is sometimes referred to as dummy variable or one-hot-or-not encoding.

The source selector and combiner 150 may also augment the input data 108 to provide augmented features that may be used by particular base learners. For example, one feature in the input data 108 may be that the loan applicant works for Company A. The source selector and combiner 150 may then augment this feature with additional features. For example, the source selector and combiner 150 may access a database over the Internet that lists public information relating to Company A, e.g., how many employees work at Company A and how many years Company A has been in existence. If Company A has 950 employees and has been in existence for 75 years, then the source selector and combiner 150 may augment the feature "works for Company A" to create additional feature values 950 and 75. The feature values 950 and 75 may also or instead be provided as inputs to particular base learners. As another example, the input data 108 may include features specifying the current amount of debt carried by the loan applicant, as well as the loan applicant's annual income. The source selector and combiner 150 may then divide the current amount of debt by the annual income to obtain a ratio that is used as an input to a particular base learner.

The source selector and combiner 150 may create augmented features that are specifically catered to a particular base learner. For example, a base learner that implements a NN may be able to compute an initial PD based on a loan applicant's financial transaction history comprising a plurality of observations made over a series of time. To augment the transaction history feature, the source selector and combiner 150 may derive the velocity and acceleration of the transactions, i.e., the rate of money spent per hour and any change in the rate. The augmented features velocity and acceleration are forwarded to and used by the NN in addition to the transaction history. The augmented features velocity and acceleration are specific to the base learner implementing the NN. These augmented features would typically not be used by a base learner that does not accept a time series of observations. For example, a base learner implementing a decision tree would typically not use the augmented features velocity and acceleration.

The synthetic feature creator 148 optionally further includes a plurality of hyper learners 1 to n and an associated slice/dice selector 152.

Each hyper learner 1 to n is a learner that implements a machine learning algorithm that, when executed, accepts one or more inputs and provides a plurality of outputs. Hyper learner 1 has $k_1$ outputs, hyper learner 2 has $k_2$ outputs, ..., and hyper learner n has $k_n$ outputs. The outputs of the hyper learners 1 to n are indicated at 156.

A hyper learner computes and outputs a set of synthetic features that corresponds to a set of events. Each output of each hyper learner is a synthetic feature representing a probability of a respective event occurring. These synthetic features may be called hyper features, because they are synthetic features created by the hyper learners, and the probabilities output by the hyper learners may be called hyper probabilities. Each hyper feature can be said to predict the hyper probability of a default signal. The default signal is a set of feature values influencing a loan default.

The set of events for which probabilities are computed for each hyper learner is different from the single binary event of loan default for which the initial PD is computed by each base learner. For example, a set of events for which respective probabilities are computed by a hyper learner may relate to paying back the loan in a delinquent manner, such as late payment. For example, output 1 of hyper learner 1 may be the probability that the loan will be paid off one month late, output 2 may be the probability that the loan will be paid off two months late, . . . and output $k_1$ may be the probability that the loan will be paid off $k_1$ months late. As another example, hyper learner 1 may compute the PD on $k_1$ alternative type of loans for which the loan applicant can qualify, in which case each output of hyper learner 1 is a PD corresponding to a respective one of the $k_1$ alternative type of loans. As another example, hyper learner 1 may compute the PD for $k_1$ other loan durations different from the loan duration requested by the loan applicant, in which case each output of hyper learner 1 is a PD corresponding to a respective one of the $k_1$ other loan durations.

The hyper learners 1 to n may be used to associate the input data 108 with a multivariate classification, i.e. instead of computing an initial PD for the loan application, as is done by each base learner, the hyper learners may predict multiple probabilities for different classes of defaults.

The slice/dice selector 152 is the interface between the input data 108 and the input of each the hyper learners 1 to n. The slice/dice selector 152 may perform the same operations as those performed by the source selector and combiner 150, such as converting the input data 108 into a form that is acceptable for the hyper learners and/or augmenting features in the input data 108, as described above. The slice/dice selector 152 additionally performs the "slicing and dicing" operation explained below.

A hyper learner computes probabilities corresponding to a set of events. The outcome of each event is variable and dependent upon the factors that influence whether or not the event occurs. Therefore, the outcome of each event will be referred to as being a dependent variable. For example, one dependent variable may be "paid back loan 30 days late", and another dependent variable may be "paid back loan late due to a natural disaster". During a training period, the slice/dice selector 152 determines the dependent variables for which the probability will be computed by the hyper learners, in accordance with the features available in the input data 108 when the input data 108 is training data. The operation of determining the dependent variables for the hyper learners based on the features in the input data 108 during training is referred to as slicing and dicing the features.

The outputs of the base learners and the hyper learners are the synthetic features 158. Each one of the synthetic features 158 is representative of a probability. The output of each base learner is an initial PD, and each output of each hyper learner represents a probability of an event occurring, the event being different from the loan default event that is associated with each initial PD and that is associated with the final PD output by the GBDT module 160. In general, each synthetic feature 158 provides a different measure of probability.

The synthetic features 158 may be considered as uncorrelated from each other for either of the following reasons: (1) the features from the input data 108 used to generate the synthetic features 158 may be different for each one of the synthetic features 158. e.g., one base learner may compute an initial PD based on the transaction history, whereas another base leaner may compute an initial PD from information in a loan applicant's personal data profile; and (2) the machine learning algorithms implemented by the different base learners and hyper learners may be inherently uncorrelated by design. i.e., two conceptually different machine learning algorithms will typically not produce identical outputs even when presented with the same inputs.

The GBDT module 160 receives the synthetic features 158, as well as at least some of the input data 108, and outputs a final PD. The final PD is the final decision of the probability of the loan applicant defaulting on the loan. The GBDT module 160 implements a GBDT algorithm. A GBDT algorithm is an algorithm that performs gradient boosting (GB) on a decision tree (DT). A DT is a tree structure used to predict the value of a target variable based on several input variables. An example of a machine learning algorithm that may be used by the GBDT algorithm is C4.5. The C4.5 algorithm is discussed, for example, in the following published textbook: Quinlan. J. R. C4.5: Programs for Machine Learning, Morgan Kaufmann Publishers, 1993.

The input to the GBDT module 160 will be called the GBDT input data. The GB performed by the GBDT module 160 fits a DT to the GBDT input data, and then uses some of the GBDT input data for prediction, usually using a positive multiplicative factor less than one. A residual representing the error in the prediction is computed and fitted again using another DT, and the process is repeated until some convergence criterion is met. The convergence criterion may be reducing the residual to a small value in the absolute sense. The multiplicative factor is known as a learning rate and may change at each iteration of the algorithm. Different machine learning algorithms may be used by the GBDT module 160, such as C4.5 implementation of DTs, which works with missing data, as discussed below.

Although the GBDT module 160 is described as implementing a GBDT algorithm, it will be appreciated that alternatively the GBDT module 160 may perform GB using an underlying learner different from a DT. However, if a DT is not used, another simple underlying learner may need to be used, and the learning process may be slower. For the GB, the following is a list of example alternative underlying machine learning algorithms that may be used instead of a DT: elastic net, simple NNs, and linear support vector machines (SVMs). Using these other underlying machine learning algorithms instead of a DT may require a special encoding of categorical and missing data.

In the loan default prediction domain, there may be missing features in the input data 108. For example, if a loan applicant refuses to provide his or her income, then that feature would be missing. The missing feature may be represented as not-a-number (NaN). If a feature from the input data 108 is missing, then some of the synthetic features 158 may not be able to be created due to the missing information. For example, a particular base learner may require the income to make a prediction, and so that base learner would not be able to output an initial PD and may instead output NaN. In one embodiment, the machine learning algorithm used by the GBDT module 160 is one that can work with missing data, i.e., a machine learning algorithm that works when one of the inputs to the GBDT module 160 is missing or designated as NaN. C4.5 is an example of such an algorithm. By executing the GBDT algorithm using an algorithm that can accommodate missing data, then a final PD may still be produced, even if some of the GBDT input data is missing. If the missing data is dealt with using a probabilistic model, a more accurate output may be achieved. For example, if a datapoint in the GBDT input data is missing, the algorithm may determine what the missing datapoint is closest to using a probabilistic model. The C4.5 algorithm uses a probabilistic approach. An alternative way of dealing with missing data may be to use a non-parametric approach, such as looking at the mean or mode of similar datapoints and filling-in, i.e., imputing, the missing data. For example, if the loan applicant's income was missing, the GBDT module 160 could take the average of all the incomes in the training set and use that as the average income, but such a non-parametric approach may lead to an inaccurate result. A probabilistic approach, such as used by the C4.5 algorithm, may look at other features and perform a weighted sum of other people's incomes, and then determine which branch to descend on in a C4.5 tree.

A GBDT algorithm may provide the ability to find non-linear transformations and handle skewed variables without requiring transformations. That is, the GBDT algorithm will constantly re-fit the residual until the residual vanishes, i.e. reduces to below a certain acceptable threshold. Hence any imbalance in the GBDT input data which was not fitted by previous iterations will be fitted by subsequent iterations, until the residual vanishes. A GBDT algorithm is also self-adapting, that is, unbalanced GBDT input data does not need to be balanced in order for the GBDT algorithm to perform well. Therefore, the GBDT algorithm has applicability to the loan default domain space, because there are typically many more instances in which a borrower does not default on a loan compared to defaulting, and so the event of "loan default" may be unbalanced compared to the event of "no loan default". It should be noted, however, that the GBDT algorithm only operates on row data, i.e. the GBDT algorithm does not use multi-row entries such as transaction data time series directly. If transaction data is part of the input data from the user, the transaction data would not be fed to the GBDT algorithm directly, but instead may pass through one of the base learners and be converted into a PD. This is the case in the specific example described later.

In operation, when input data 108 is received relating to a new loan application, the input data 108 is used to create a plurality of synthetic features 158. Each synthetic feature 158 represents a probability. The synthetic feature output by each base learner is an initial PD for the loan. The synthetic features 158 and at least some of the input data 108 is then processed by the GBDT module 160 to obtain a final PD.

In the embodiment of FIG. 3, GS and a GBDT algorithm are adapted to a new domain of PD modeling. A large number of synthetic features 158 may be generated so that at least a small combination of them will capture the default signal, that is, be acceptably good at predicting PD. In the embodiment of FIG. 3, ensemble learning is utilized by combining multiple base learners into a system that may automatically learn complex human behavior in the context of loans using a GBDT algorithm. Because human behavior and economic conditions may change over time, the embodiment in FIG. 3 uses different features from the input data 108 and different machine learning algorithms. i.e., multiple base learners and optionally hyper learners, without needing to know which approach will work best ahead of time. A potentially large set of input data 108 is transformed by the computer 102 into a single output that is a number representing the final PD.

GS enlarges the feature space with synthetic features 158. By generating the synthetic features 158 and then combining the synthetic features 158 with the input data 108 via the GBDT algorithm, the challenges often found in the domain of loan default prediction may be better handled. Examples of such challenges include: (1) missing data, which occurs when data in the loan application is not provided; (2) skewed/unbalanced data, which occurs because loan default happens less frequently than no loan default; and (3) non-linear transformations, which is when the features influencing the PD have a non-linear relationship. For example, the relationship between transactions and income in relation to the PD on a loan may be non-linear. A more accurate and less labor intensive prediction of PD may be possible using the embodiment in FIG. 3. A technological problem in the field of lending, i.e., using a computer to try to predict a probability of loan default, is addressed. In the embodiment in FIG. 3, ensemble learning is used by the computer 102 due to the plurality of base learners and optional hyper learners. The ensemble learning may leverage complex patterns in human behavior.

As mentioned above, each base learner and each hyper learner implements a respective machine learning algorithm. Each machine learning algorithm may have embedded feature selection and parameter tuning components, so that the machine learning algorithm may perform its best given a set of input features. Examples of machine learning algorithms that may be used are listed below. The list is not considered to be exhaustive:

(1) Normalization of Global Effects: Machine learning algorithms falling within this machine learning approach have a baseline and cyclic effect that provides a coarse prediction of PD. These machine learning algorithms may be used to model general trends in the market and the population using common regression methods. For example, a machine learning algorithm may regress the fraction of defaults of a certain population group during a particular time slice on global market indicators, such as GDP, corporate and treasury interest rates, etc. Then, when a base learner is predicting initial PD for an individual during a certain time, the base learner may bias the initial PD output with a general PD prediction. Cyclic effects are modeled by regressing defaults on pre-defined cyclic factors which are deemed to be economically meaningful. In the example above, GDP implicitly captures cyclic market trends.

(2) Neighbourhood Models: Machine learning algorithms falling within this machine learning approach predict PD from the "neighbours" of the loan applicant, i.e., the fraction of loan applicants who have defaulted in the past, and which are similar to the current loan applicant. Methods which may be applied as a base learner include K-Nearest Neighbours (KNN). K-means, Mixture of Guassians (MoG), and Hidden Markov Models (HMMs).

(3) Elastic Net: Machine learning algorithms falling within this machine learning approach use a linear regression approach similar to Normalization of Global Effects, and which adds regularization to avoid overfitting and implicit parameter selection using the least absolute shrinkage and selection operator (LASSO) penalty. Regularization parameter Lambda on the unit interval [0,1] controls the degree of regularization. i.e. smoothing of the fit, and the LASSO parameter Alpha, also on the unit interval [0,1], controls the degree of feature selection. When Alpha is close to 1, many coefficients will be shrunk to zero. Both parameters are tuned internally using a hold-out cross-validation approach.

(4) Factoring: Machine learning algorithms falling within this machine learning approach use more elaborate regression models that may be constructed by projecting PDs of loan applicants on a variety of synthetic and real factors. These methods provide the flexibility of building custom factors. As a result, first the factors have to be learned, and then the projections on the factors have to be learned.

(5) Decision Trees (DTs): Machine learning algorithms falling within this machine learning approach generate a sequential set of if/else rules to predict the PD. Rules can be generated using a variety of methods, and hence a different number of DTs may be used. Rules are represented as an inverted tree, with the root of the tree at the top and the order of the rules descending from the root. The leaves of the tree predict PD values, forming a step function. Model-based decision trees form an additional model for the final prediction at each leaf node.

(6) Ensemble Methods: A general term that refers to combining multiple prediction methods. As an example, "Bagging" and "Forest" machine learning techniques may be used. Bagging samples training data with replacement to form p separate training data sets. A DT is built on each dataset, and the final prediction is the average of predictions from p DTs. Bagging decorrelates the individual predictors, and as a result the variance of the final prediction decreases, which may improve the final test score. Forest techniques go a step further, and decorrelate each DT at each rule split, by only allowing a subset of features to be split on as each rule is built. Features are sampled using a variety of techniques.

(7) Neural Networks (NNs): These machine learning methods include deep learning techniques and create a graph of neurons, also called nodes, which attempt to mimic the structure of the neurons in a human brain. Categorical features may be encoded into binary feature vectors, and the rest of features are standardized to a similar unit scale. The features form the input layer of the NN and interconnect to the hidden units, which form the bulk of the NN's structure. Different types of hidden units may be constructed, with different mathematical functions at each node. In the case of PD prediction, hidden units are mapped to a single final node in the NN, which outputs the PD prediction. The complex structure of the NN may be able to handle very non-linear decision boundaries, but as a result may be expensive to train. As a specific example: NNs may be used to process and monitor user's transaction history and indicate a threat of default as soon as transaction history patterns change. More specifically, during training a window may be defined which keeps track of transaction records, e.g., a window that tracks the past 100 transactions. Each transaction is labeled with a date and time and the category which applies. The transactions are mapped to a binary encoding in the NN input layer. Transactions are ordered in time, so as soon as a new transaction becomes available the oldest transaction is discarded and a new datapoint for the NN is formed. Each such datapoint of transactions is labeled with a binary event: either default or non-default. If the person has 1000 transactions, and the window is 100 transactions large, then 900 such datapoints can be formed. During the prediction stage, older transactions may be discarded as soon as new transactions become available. Hence the NN may be always monitoring changes in recent transaction patterns.

(8) Support Vector Machines (SVMs): Instead of mapping the input layer of NNs into a possibly complex architecture of the hidden layer, machine learning algorithms that implement SVMs map the input layer into an infinite-dimensional space using kernels. In practice, kernel representations are finite-dimensional, but the idea is the same: an input feature vector of dimension a is mapped to a much higher dimension b>>a. In that higher dimension a linear classifier is used. Such mapping may allow SVMs to learn highly-non-linear patterns in the input feature space, but like the NNs, may make SVMs very expensive to train. For regression problems, the sort which may be used to model the PD, the classifier is changed to perform regression as opposed to classification; such an approach is commonly-known as Support Vector Regression (SVR).

(9) Natural Language Processing (NLP): A lot of very strong signals may be hidden in textual data. Examples of such textual data may include news events about the company where the loan applicant is being employed, historical natural disasters pertaining to the geographical area where the loan applicant is residing, etc. Biasing PD with unstructured textual data may help improve the accuracy of predictions. As a simple example, approaches such as Naïve Bayes may be used to bias a prediction or associated credit score based on the word content of the loan application letter provided by the loan applicant. More advanced linguistic approaches may be used by mining news data that is related to the loan applicant's employment history.

In some cases, it may be necessary to handle categorical data in base learners, such as, for example, home ownership, which can be mortgage, own, rent, etc. As mentioned in some of the examples above, one way to handle categorical data is through the use of binary encoding, which maps a single categorical feature to a list of binary indicator columns which are used as inputs into the selected base learners.

In some embodiments, the final PD output by the GBDT module 160 may be used to compute the SP. As mentioned above SP=1−PD. In some embodiments, the computer 102 may use the PD or the SP to generate a credit score. The credit score is generated by the computer 102 using a computer-implemented rule decided upon by the lender and programmed into the computer 102. As one example, the credit score may be the SP multiplied by 1000. As another example, the credit score may be a number between 250 and 900, and the SP may be mapped to within the range 250 to 900 using a linear function. A number of rules or functions may be used to obtain the credit score from the PD or SP.

The PD, the SP, or the credit score may be used by the computer 102 to determine whether to approve or deny the loan application. For example, the computer 102 may generate an indication of whether or not to approve the loan based on whether a particular value based on the PD, SP, or the credit score is above or below a stored threshold. The particular value may be the PD or the SP or the credit score or a function of the PD, the SP, or the credit score. The value of the threshold may be decided upon by the lender and programmed into the computer 102. For example, if the lender wishes to try to reduce the number of situations in which a decision is made to provide a loan and the loan applicant subsequently defaults on that loan, then the threshold value for classifying the loan as approved may correspond to a high SP, such as SP>0.9. Alternatively, if the lender wishes to try to reduce the number of situations in which a loan application is rejected when the loan applicant would have been able to pay back the loan, then the threshold value for classifying the loan as approved may correlate to a lower SP. Different lenders may have different rules for whether or not to approve the loan, based on the same final PD value. What changes is how the final PD, or related SP or credit score, is thresholded. The threshold may be calibrated on a test data set.

Figure 4:
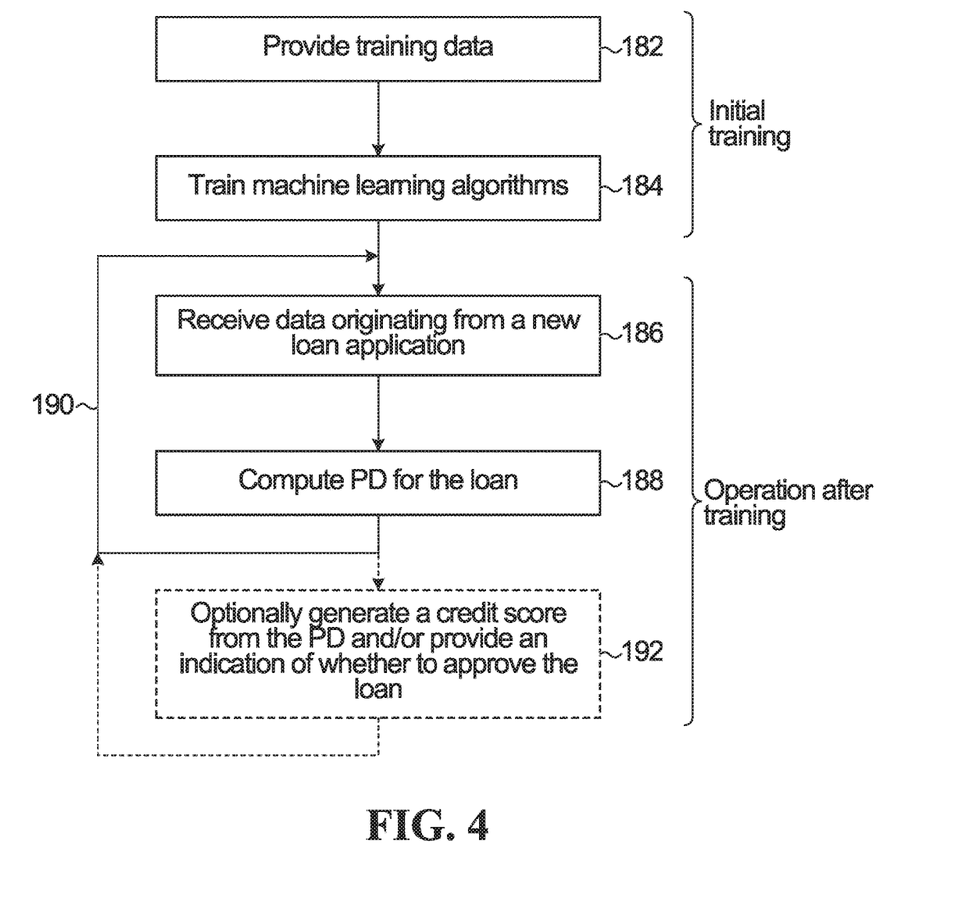
FIG. 4 is a flow chart of a method of using the predictor of FIG. 3 in accordance with one embodiment.

FIG. 4 is a flow chart of a method of using the predictor 106 of FIG. 3 in accordance with one embodiment. First, the predictor 106 is trained in a training phase. The training phase consists of steps 182 and 184. In step 182, training data stored in memory 104 is provided as the input data 108. The training data consists of several instances in the past in which a loan was made, and in which it was recorded whether or not the borrower defaulted on the loan, and the corresponding information related to the borrower, e.g. the borrower's income, occupation, transaction history, etc. In step 184, the training data is then used to train the machine learning algorithms implemented by the base learners and the hyper learners, as well as for training the GBDT algorithm implemented by the GBDT module 160. The GBDT algorithm is trained on both the input data 108 and the synthetic features 158. The training may occur using regression or classification, depending upon the amount and nature of the training data available. The training may include determining which features are good candidates to be used as inputs for each machine learning algorithm. A given machine learning algorithm may be able to use certain features to output a more accurate PD, but other features, if accepted as an input to the machine learning algorithm, may act as noise and reduce the effectiveness of the machine learning algorithm. The training may determine which features act as noise for each machine learning algorithm and which features help result in a more accurate PD, and thereby determine which machine learning algorithms are to receive which features as inputs.

Once the training phase is complete, then the predictor 106 is used to compute PD for new loan applications. The post-training operation consists of steps 186 to 190, and optionally step 192. In step 186, new input data 108 comprising data originating from a new loan application is received at the predictor 106. In step 188, the predictor 106 computes the PD for the loan in the manner described above in relation to FIG. 3. Steps 186 and 188 are repeated for each new loan application, as shown at 190. Optionally, in step 192, for a given loan application, the computer 102 may use the PD computed in step 188 to generate a credit score for the loan applicant, and/or the computer 102 may provide an indication of whether to approve the loan based on a computer-rule, e.g. if PD computed in step 188 is less than the threshold 0.1, then return "Yes—approve loan". Although the method of FIG. 4 illustrates a single training phase prior to receiving new loan requests, alternatively some training of the predictor 106 may continue during operation based on updated information.

The exact implementation of the predictor 106 illustrated in FIG. 3 is dependent upon which and how many base learners and hyper learners are chosen and what features in the input data 108 can be handled. A specific example will now be given.

In the example, the input data 108 accepted by the predictor 106 is limited to the following: loan amount, loan duration, home ownership, transaction history, and average treasury rates of the loan applicant's country of residence. In the example, one and three year treasury rates are available. Two base learners and one hyper learner are used to create synthetic features in the example. The first base learner is a NN that accepts as its input the transaction history and outputs an initial PD. The second base learner is a Random Forest of DTs that accepts as its input loan amount, home ownership and average treasury rates and outputs an initial PD. Note that Random Forest can work with categorical data, such as home ownership, directly. In the example, the DT implements the C4.5 algorithm. Both base learners are trained using binary outcomes as the dependent variable, where the outcome is true if there was some delinquency with a loan, for example, not repaying the loan in full, delay in payments of one month, complete default on the loan, fraudulent loan, etc.

The hyper learner is Elastic Net that accepts the same inputs as the Random Forest, with the exception that home ownership is encoded using binary dummy variables. The dependent variable for the hyper learner is modified as well. Specifically, a series of dependent variables are created, one for each type of delinquency. In the example, a single dependent variable is created for all delinquencies in which a payment was late by 30 days, and an additional dependent variable is created in which the delinquency was caused by a natural disaster. More dependent variables could be created, but the number of such dependent variables is limited by the input data 108. Each dependent variable represents a class: a class for 30 day delinquencies and a class of defaults due to natural disasters. Each dependent variable could correspond to some other signal which may not have a human interpretation, but which may be highly correlated with the PD, but such dependent variables are outside of the scope of the example.

Once the dependent variables are created, multinomial classification is performed. One approach is to use a one-versus-all classification, where the class with the highest probability is selected during a classification stage. The individual class probabilities for each dependent variable form the set of hyper features. In the example, there are two such hyper features: 30 day delinquencies and natural disasters.

Therefore, in the example, there are two synthetic PD predictions: one from the NN and the other from the Random Forest. There are also two hyper features: 30-day delinquencies and natural disasters. These form a set of four synthetic features 158 for each loan applicant, which are then fed into the GBDT algorithm in addition to loan amount, loan duration, home ownership, transaction history, and two average treasury rates. Hence the feature space has been enlarged by four additional synthetic features.

During training, the training data is split into a training set and a test set. For example, the latest month of defaults may be used as the test set. As another example, 10% of the latest observations may be used as the test set and the rest as the training set. Because the computer is learning probabilities, Area Under Curve (AUC) may be used as the performance metric, which is commonly used in Kaggle™ competitions. The computer 102 may then perform a greedy search over all combinations of features to determine if the computer 102 can form a subset of features which increases the AUC for a given machine learning algorithm with default settings. For example, the computer 102 may drop features one by one, retraining the algorithm on the training set and scoring AUC on the test set, and then determining if any subset of features increases the AUC after re-training on the reduced subset of features.

The same feature selection technique is performed for the base learners and the hyper learners. As a result, a unique subset of features is mapped to each base learner and hyper learner.

Once each feature set is formed, the computer 102 may continue to maximize the performance of each machine learning algorithm by tuning the parameters associated with the machine learning algorithm. For example, a key parameter of the Random Forest algorithm is the number of trees used, NNs have an infinite variety of arrangements of neurons and filters. Elastic Net has regularization as two of its main parameters, etc. The computer 102 can perform a grid search over the space of parameters for each machine learning algorithm that further increases AUC on the test set. For example, a Random Forest performs a simple linear search over the space of the number of DTs used, up to allowed memory limit, which is usually up to 10,000-100,000 trees in the ensemble. Elastic Net can perform a grid search over combinations of alpha and lambda parameters, and for the NN search, the computer 102 can experiment with various pre-defined NN structures deemed to be useful. The NN may be regularized, and dropout is one technique that may be used to regularize the NN.

Each machine learning algorithm in the example is mapped to a set of input features and optimal set of parameters, and can together generate the final set of synthetic features 158. The computer 102 can re-train each base learner on the full set of data to generate the synthetic features 158.

In the example, the GBDT algorithm uses a C4.5 DT on all of the input data except the transaction data, and on the four synthetic features 158. That is, the input to the GBDT algorithm is the output of the two base learners (the NN and the Random Forest), the output of the hyper learner (the Elastic Net), and the original input data 108 of loan amount, loan duration, home ownership, and average treasury rates of the loan applicant's country of residence. Note that the transaction data is instead used to derive a synthetic feature, and the transaction data is not directly used by the GBDT algorithm.

Both Random Forest and the GBDT algorithm use the same C4.5 algorithm in the example. This is purposely chosen in the example to illustrate that the same DT framework may be used by different ensemble methods differently and in different stages of the learning. Random Forest will have an ensemble of learned C4.5 DTs, and the GBDT algorithm will have a sequence of boosted C4.5 DTs. Other types of DTs may be used by both algorithms; C4.5 is just one example.

In the example, the GBDT algorithm learns on observed binary classes, but the final PD can be computed by averaging the weighted votes from each sequential step of the GBDT algorithm. Alternatively, C4.5 can produce probabilities for each prediction, and a weighted average of the probabilities may be used to compute the final PD.

Once the final PD is generated by the GBDT algorithm, the computer 102 may map the final PD to a credit score and define a threshold with which to classify. One common technique of classifying defaults is to select a classification threshold which maximizes the $F_1$ score. The $F_1$ score may be modified in more conservative settings, for example if it is desired to have a higher than usual sensitivity to defaults.

If, during operation, transaction history is missing as an input for a certain individual, then one of the four synthetic features will not be available: the NN output. However, the missing synthetic feature can be accommodated by the GBDT algorithm in the example.

A summary of the Decision Tree C4.5 discussed above may be found in the published textbook mentioned earlier: Quinlan, J. R. C4.5: Programs for Machine Learning, Morgan Kaufmann Publishers, 1993. A summary of the Random Forest machine learning algorithm discussed above may be found in the following published paper: Breiman, "Random Forests". Machine Learning, 45(1), 5-32, 2001. A summary of the NN discussed above may be found in the following published textbooks: Ripley. B. D. (1996) Pattern Recognition and Neural Networks. Cambridge, and Venables. W. N, and Ripley. B. D. (2002) Modern Applied Statistics with S. Fourth edition, Springer. An example of the Elastic Net discussed above may be found in the following published paper: Jerome Friedman. Trevor Hastie, Robert Tibshirani (2010), Regularization Paths for Generalized Linear Models via Coordinate Descent. Journal of Statistical Software, 33(1), 1-22.

Figure 5:
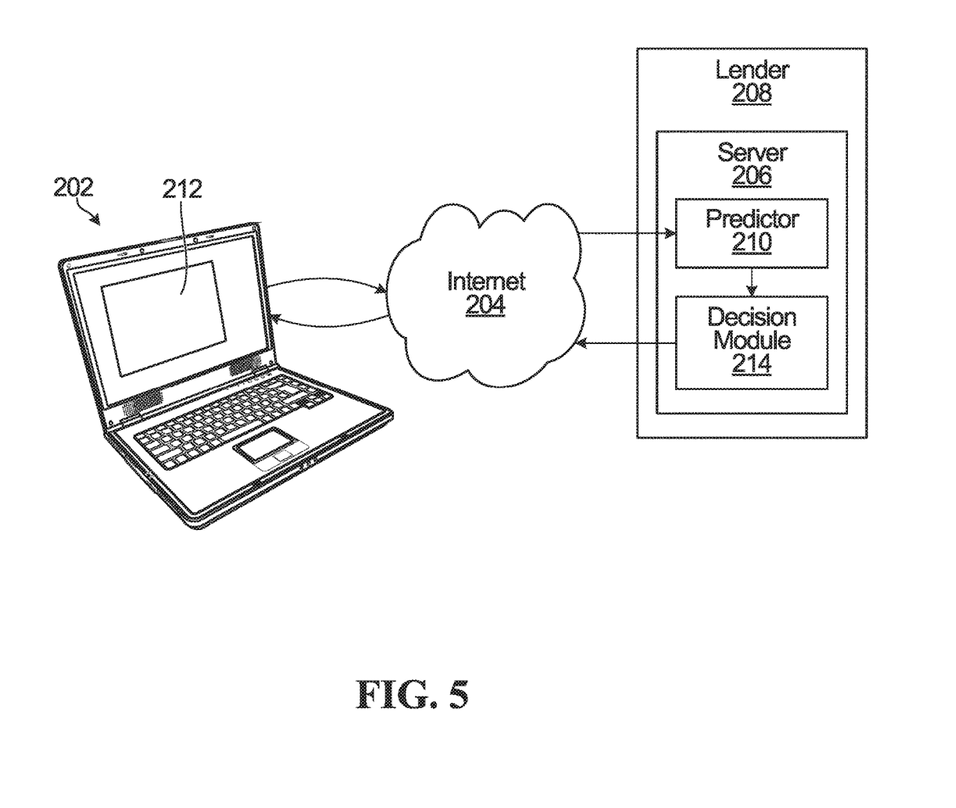
FIG. 5 is a block diagram of a system illustrating use of a loan default predictor in accordance with one embodiment.

FIG. 5 is a block diagram of a system illustrating use of a loan default predictor in accordance with one embodiment. The system illustrated includes a network-connected device 202 connected over the Internet 204 to a server 206. As an example, the network-connected device 202 could be a personal computer, a computer at the lending institution, a mobile phone, or tablet. The server 206 is operated by a lender 208, and the server 206 hosts a predictor 210. The predictor 210 may be predictor 106 from FIG. 3. The predictor 210 has been trained and therefore outputs a PD for given a set of data relating to a new loan application 212. A decision module 214 implements one or more computer rules to determine whether to grant the loan based on the PD, and/or whether to provide alternative options to the loan applicant based on the PD.

In operation, the loan applicant completes the loan application 212 online via the network-connected device 202. The data entered into the loan application 212 is sent over the Internet 204 to the server 206, which may supplement the data with additional input data. Examples of additional input data include the current interest rate, trending news stories, or any other information not part of a loan application but accepted by the predictor 210. All input data is then sent to the predictor 210, which computes and outputs a PD. The PD is sent to the decision module 214, which uses an automatic computer-implemented rule to determine whether the loan should be granted, e.g. if PD<0.1, then "Yes—we approve the loan". In some embodiments, a credit score may be computed by the decision module 214 based on PD and used to determine whether the loan should be granted. The answer is sent back over the Internet 204 to the loan applicant. In an alternative embodiment, when the server 206 receives the information from the loan application 212, the server 206 can instead query the predictor 210 multiple times with loan amounts different from that requested by the loan applicant. For example, the loan applicant may ask for a loan of $10,000, but the server 206 also sends to the predictor 210 alternative loan request amounts of $5,000 and $15,000. Based on the PD for each loan amount, the decision module 214 can then return options to the loan applicant, e.g. "You do not qualify for a $10,000 loan, but you do qualify for a $5.000 loan" or "You qualify for the $10,000 loan, but you also qualify for a $15.000 loan if you would like to take that instead", depending upon what the PD is for each loan amount. A similar system could be used for micro-loans or for peer-to-peer lending, in which case the predictor 210 may be implemented on another server operated by an intermediary company facilitating the loans. In particular, peer-to-peer lending has a different funding concept compared to traditional lending. In peer-to-peer lending, there is often a need to handle a large volume of requests and a need for relatively quick decisions. Peer-to-peer lending systems may be heavily automated with machine learning technology.

In the examples above, during operation after training a predictor receives input data corresponding to a loan application from a single loan applicant. Alternatively, if the predictor was servicing a large pool of applicants, such that there were many loan applications filed in a short period of time, the predictor may accept a batch of input data on a periodic basis. The batch includes several sets of input data, one for each loan application made since the last batch. The output would be a batch of PDs, one for each loan application. By processing on a batch-by-batch basis, some optimizations may be possible.

Figure 6:
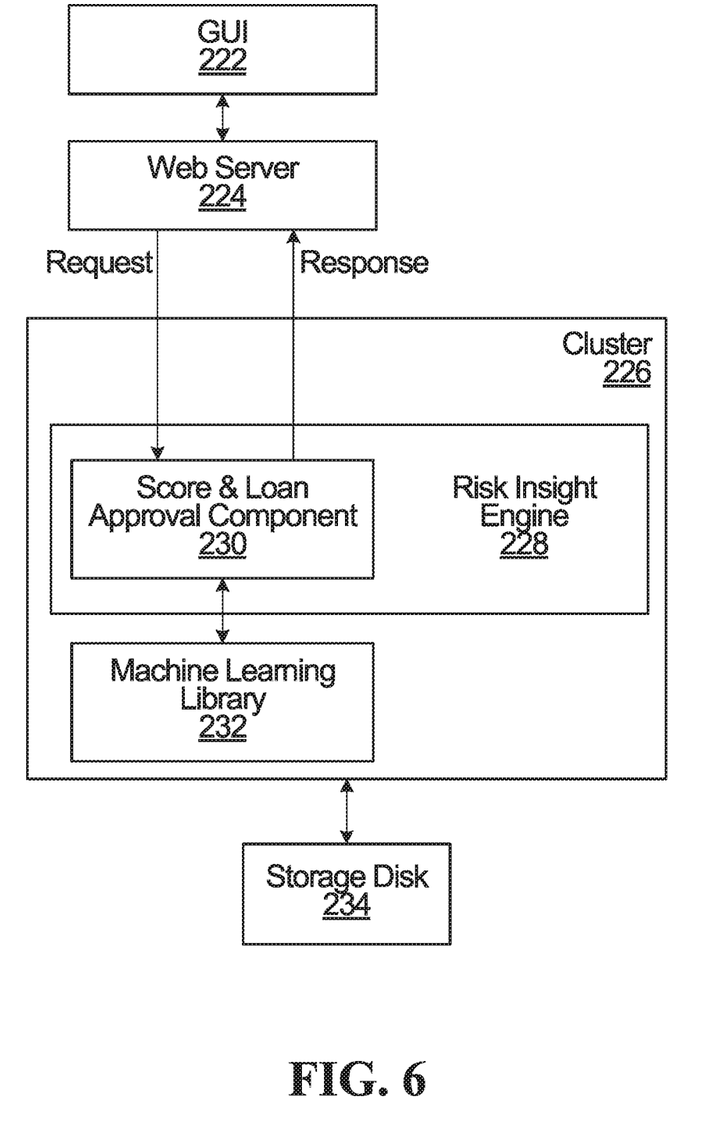
FIG. 6 is a block diagram of a system in which a loan default predictor may reside in accordance with one embodiment.

FIG. 6 is a block diagram of a system in which a loan default predictor, such as predictor 106 or predictor 210, may reside in accordance with one embodiment. The system includes a graphical user interface (GUI) 222 connected to a web server 224, which is connected to a cluster of computers 226 that implements a risk insight engine 228. The risk insight engine 228 includes a score and loan approval component 230, which implements the loan default prediction. The score and loan approval component 230 accesses a machine learning library 232 to call upon machine learning algorithms implemented by the base learners and hyper learners. The cluster of computers 226 accesses a storage disk 234, as necessary, which can store any needed data, such as the training and test data. In operation, after training, a person completes a loan application using the GUI 222. The person completing the loan application may be the loan applicant or a bank employee on behalf of the loan applicant. The web server 224 stores the loan applicant data and forwards a loan request and associated data to the score and loan approval component 230. The score and loan approval component 230 determines the PD and whether to approve the loan. At least the decision as to whether to approve the loan is returned to the web server 224 and displayed on the GUI 222. When determining the PD, the score and loan approval component 230 draws upon the machine learning library 232 to execute the machine learning algorithms.

Figure 7:
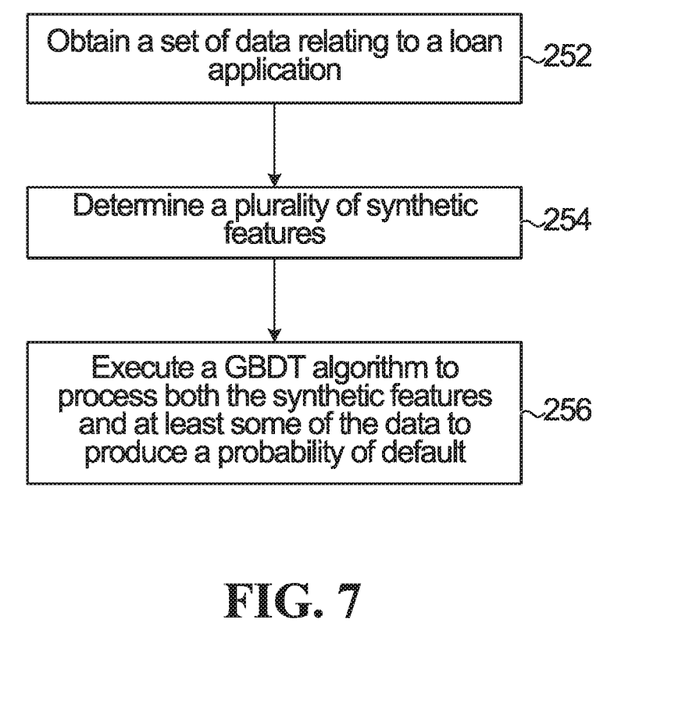
FIG. 7 is a flowchart of a method that may be performed by a computer in accordance with one embodiment.

Different examples are provided above. More generally, FIG. 7 is a flow chart of a method that may be performed by a computer in accordance with one embodiment. In step 252, the computer obtains a set of data relating to a loan application. In step 254, the computer determines a plurality of synthetic features by at least: executing a plurality of machine learning algorithms, each of the machine learning algorithms, when executed, receiving as an input at least some of the data and producing as an output a respective synthetic feature representing an initial probability of whether a loan default will occur. The data input to each of the machine learning algorithms may be different from each other, or in some cases the data input into each of the machine learning algorithms may be the same or partially overlapping. Each machine learning algorithm is implemented by a base learner.

In step 256, the computer executes a GBDT algorithm to process both (i) the synthetic features determined in step 254 and (ii) at least some of the data from step 252, to produce an output representing a final probability of whether the loan default will occur. In some embodiments, the GBDT algorithm may process all of the data from step 252, except for data comprising a series of observations made over a period of time. e.g., data comprising a history of financial transactions.

In some embodiments, the method optionally further includes the computer generating an indication of whether or not to approve the loan based on whether a particular value is above or below a stored threshold. The particular value is based on the final probability.

In some embodiments, the plurality of machine learning algorithms are a first set of machine learning algorithms implemented by base learners. Determining the plurality of synthetic features may further include: the computer executing at least one other machine learning algorithm implemented by a hyper learner. The at least one other machine learning algorithm, when executed, receives an input based on at least some of the data and produces a plurality of outputs. Each one of the plurality of outputs is a synthetic feature representing a probability of an event occurring, the event being different from the loan default that is associated with the final probability. In some embodiments, the event may comprise late payment of the loan.

In some embodiments, the computer performs binary encoding of at least some of the data to produce binary encoded data, and the computer inputs the binary encoded data to at least one of the machine learning algorithms. In some embodiments, the computer augments the data with at least one additional feature, and the computer inputs the at least one additional feature to at least one of the machine learning algorithms. In some embodiments, the data includes text, the computer extracts a feature from the text to obtain an extracted feature, and the computer inputs the extracted feature to at least one of the machine learning algorithms.

In some embodiments, at least two of the machine learning algorithms are different from each other. In some embodiments, at least two of the machine learning algorithms accept different inputs.

In some embodiments, the data includes an amount of loan requested and a loan duration. In some embodiments, the data includes a transaction history of the loan applicant, and one of the machine learning algorithms is a NN that accepts the transaction history as an input.

In some embodiments, the method further includes the computer training the machine learning algorithms. The training may include using training data and test data to determine what inputs are to be used for each machine learning algorithm by: the computer trying different possible inputs and selecting a set of one or more inputs that best satisfy a metric. e.g. using the AUC metric discussed earlier.

In some embodiments, a system for performing any of the above methods is disclosed. In one embodiment, the system may include a memory to store a set of data relating to a loan application, and a predictor to receive the data and to output a final probability representative of whether a loan default will occur. The predictor may include a plurality of learners, each learner implementing a respective machine learning algorithm. The predictor may be configured to perform the operations described herein. In another embodiment, the system may include at least one processor and memory having stored thereon processor-executable instructions that, when executed, cause the at least one processor to perform the operations described herein.

Finally, in the discussion above, the method of FIG. 2 is applied to the specific event of loan default, and a probability is produced that is the PD. Alternatively, the method of FIG. 2 may be applied to other applications, such as detecting fraud. In the example of detecting fraud, the input data would be parameters relating to factors influencing whether there may be fraud, and the output may be the probability of fraud (PF). It is mentioned above that more generally the GBDT algorithm may be replaced with GB using another underlying learner that is different from a DT. Using GB with another underlying learner different from a DT is also possible for other applications, like fraud detection.

Although the present invention has been described with reference to specific features and embodiments thereof, it is evident that various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
    the computer obtaining a set of data relating to a loan application, wherein the data includes an amount of loan requested and a transaction history of a loan applicant;
    the computer determining a plurality of synthetic features by at least: executing a plurality of machine learning algorithms that have been trained, each of the machine learning algorithms, when executed, receiving as an input at least some of the data and producing as an output a respective synthetic feature representing an initial probability of whether a loan default will occur, wherein at least two of the machine learning algorithms are different from each other and accept different inputs; wherein a first one of the machine learning algorithms is implemented using a neural network and accepts the transaction history of the loan applicant as its input and outputs a first synthetic feature representing a first initial probability of whether the loan default will occur, and wherein a second one of the machine learning algorithms accepts the amount of loan requested as its input and outputs a second synthetic feature representing a second initial probability of whether the loan default will occur;
    the computer executing a gradient boosted decision tree (GBDT) algorithm, the GBDT algorithm processing both: (i) the synthetic features including the first synthetic feature and the second synthetic feature, and (ii) at least some of the data, and producing an output representing a final probability of whether the loan default will occur;
    the computer generating an indication of whether or not to approve the loan based on whether a particular value is above or below a stored threshold, wherein the particular value is the final probability or is a function of the final probability.

2. The computer-implemented method of claim 1, wherein the plurality of machine learning algorithms are first machine learning algorithms, and wherein the computer-implemented method further comprises:
    the computer executing at least one other machine learning algorithm different from the first machine learning algorithms, the at least one other machine learning algorithm, when executed, receiving an input based on at least some of the data and producing a plurality of outputs;
    wherein each one of the plurality of outputs is a synthetic feature representing a probability of an event occurring, the event being different from the loan default that is associated with the final probability.

3. The computer-implemented method of claim 2, wherein the event comprises late payment of the loan.

4. The computer-implemented method of claim 1, further comprising:
    the computer performing binary encoding of at least some of the data to produce binary encoded data; and
    the computer inputting the binary encoded data to at least one of the machine learning algorithms.

5. The computer-implemented method of claim 1, further comprising:
    the computer augmenting the data with at least one additional feature; and
    the computer inputting the at least one additional feature to at least one of the machine learning algorithms.

6. The computer-implemented method of claim 1, wherein the data further includes a loan duration.

7. The computer-implemented method of claim 1, further comprising:
    the computer training the plurality of machine learning algorithms, the training including using training data and test data to determine what inputs are to be used for training each machine learning algorithm by: the computer trying different possible inputs and selecting a set of one or more inputs that best satisfy a metric.

8. A system comprising:
    a memory to store a set of data relating to a loan application, wherein the data includes an amount of loan requested and a transaction history of a loan applicant;
    a predictor to receive the data and to produce an output representing a final probability of whether a loan default will occur;
    the predictor including a plurality of learners that have been trained, each learner implementing a respective machine learning algorithm, and wherein at least two of the learners implement a machine learning algorithm different from one another that accepts inputs different from one another;

the predictor configured to:
determine a plurality of synthetic features by sending to each of the learners at least some of the data, and each of the learners outputting a respective synthetic feature representing an initial probability of whether the loan default will occur, wherein a first learner of the learners implements a neural network and accepts the transaction history of the loan applicant and outputs a first synthetic feature representing a first initial probability of whether the loan default will occur, and wherein a second learner of the learners accepts the amount of loan requested as its input and outputs a second synthetic feature representing a second initial probability of whether the loan default will occur; and execute a gradient boosted decision tree (GBDT) algorithm, the GBDT algorithm processing both: (i) the synthetic features including the first synthetic feature and the second synthetic feature, and (ii) at least some of the data, and producing the output representing the final probability of whether the loan default will occur;

wherein the system is configured to generate an indication of whether or not to approve the loan based on whether a particular value is above or below a stored threshold, wherein the particular value is the final probability or is a function of the final probability.

9. The system of claim 8, wherein the plurality of learners are first learners, and wherein the predictor is configured to perform:

sending an input to at least one other learner different from the first learners, the input based on at least some of the data, and the at least one other learner implementing a machine learning algorithm that, when executed, receives the input and produces a plurality of outputs;

wherein each one of the plurality of outputs is a synthetic feature representing a probability of an event occurring, the event being different from the loan default that is associated with the final probability.

10. The system of claim 9, wherein the event comprises late payment of the loan.

11. The system of claim 8, wherein the predictor is further configured to:

perform binary encoding of at least some of the data to produce binary encoded data; and send the binary encoded data to at least one of the learners.

12. The system of claim 8, wherein the predictor is further configured to:

augment the data with at least one additional feature; and send the at least one additional feature to at least one of the learners.

13. The system of claim 8, wherein the data further includes a loan duration.

14. The system of claim 8, wherein the system is configured to train the plurality of learners, the training comprising using training data and test data to determine what inputs are to be sent to each learner by: the system trying different possible inputs and selecting a set of one or more inputs that best satisfy a metric.

15. A system comprising:

at least one processor; and memory having stored thereon processor-executable instructions that, when executed, cause the at least one processor to:

obtain a set of data relating to a loan application, wherein the data includes an amount of loan requested and a transaction history of a loan applicant;

determine a plurality of synthetic features by at least: executing a plurality of machine learning algorithms that have been trained, each of the machine learning algorithms, when executed, receiving as an input at least some of the data and producing as an output a respective synthetic feature representing an initial probability of whether a loan default will occur, wherein at least two of the machine learning algorithms are different from each other and accept different inputs; wherein a first one of the machine learning algorithms is implemented using a neural network and accepts the transaction history of the loan applicant and outputs a first synthetic feature representing a first initial probability of whether the loan default will occur, and wherein a second one of the machine learning algorithms accepts the amount of loan requested as its input and outputs a second synthetic feature representing a second initial probability of whether the loan default will occur; and execute a gradient boosted decision tree (GBDT) algorithm, the GBDT algorithm processing both: (i) the synthetic features including the first synthetic feature and the second synthetic feature, and (ii) at least some of the data, and producing an output representing a final probability of whether the loan default will occur;

generate an indication of whether or not to approve the loan based on whether a particular value is above or below a stored threshold, wherein the particular value is the final probability or is a function of the final probability.

* * * * *